United States Patent [19]

Wolstenholme et al.

[11] 3,965,776

[45] June 29, 1976

[54] TOOL FOR APPLYING RETAINER CLIPS

[76] Inventors: Charles T. Wolstenholme, R.D. 2, Box 268, Milton, Del. 19968; Douglas E. Sipple, P.O. Box 62, Georgetown, Del. 19947

[22] Filed: Sept. 16, 1975

[21] Appl. No.: 613,878

[52] U.S. Cl. .................................. 81/3 R; 29/229; 29/243.56

[51] Int. Cl.[2] .................... B23P 19/08; B25B 27/20

[58] Field of Search ................ 81/3 R, 3 E; 29/225, 29/229, 243.56, 243.57, 200 H

[56] References Cited

UNITED STATES PATENTS

| | | | |
|---|---|---|---|
| 2,835,028 | 5/1958 | Wurzel | 29/229 |
| 3,470,600 | 10/1969 | Hosbach | 29/229 |

*Primary Examiner*—Al Lawrence Smith
*Assistant Examiner*—Roscoe V. Parker
*Attorney, Agent, or Firm*—Bacon & Thomas

[57] ABSTRACT

A tool for installing a retainer clip on a headed stud, the clip including an upstanding forward flange and a central upturned stud engaging portion, the tool having a pair of longitudinal pusher prongs that are vertically offset from each other and provided with undercut areas on the inner sides of each prong terminating at a forwardly sloping bevel wall section on each prong. The lateral spacing of the prongs and the undercut areas are preferably dimensioned to accommodate different size clips, with the bevel wall sections engaging the edges of the upturned central portion of the larger size clip to be installed by the tool. The forward extremities of the prongs engage the upstanding forward flange of the clip and the prongs are vertically offset slightly at their extremities to enable the clip to be frictionally retained on the prongs during the installation operation.

4 Claims, 9 Drawing Figures

Fig. 1.
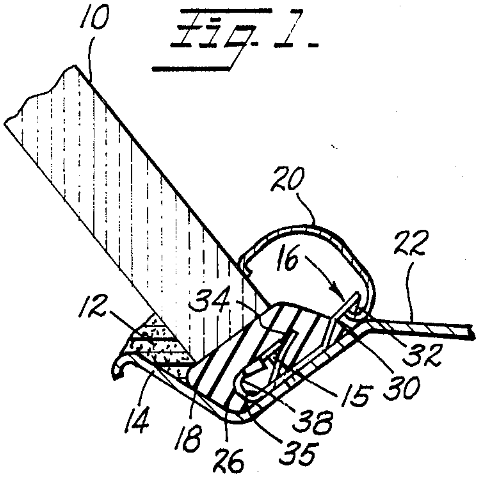
Fig. 2.
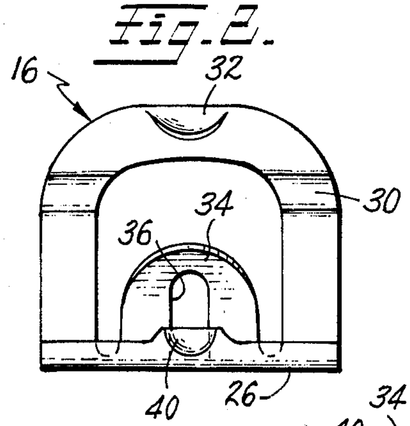
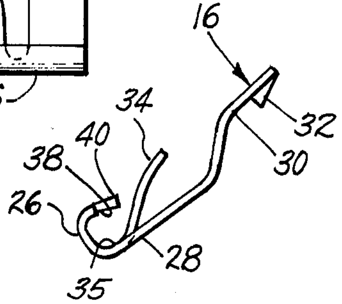
Fig. 3.
Fig. 4.
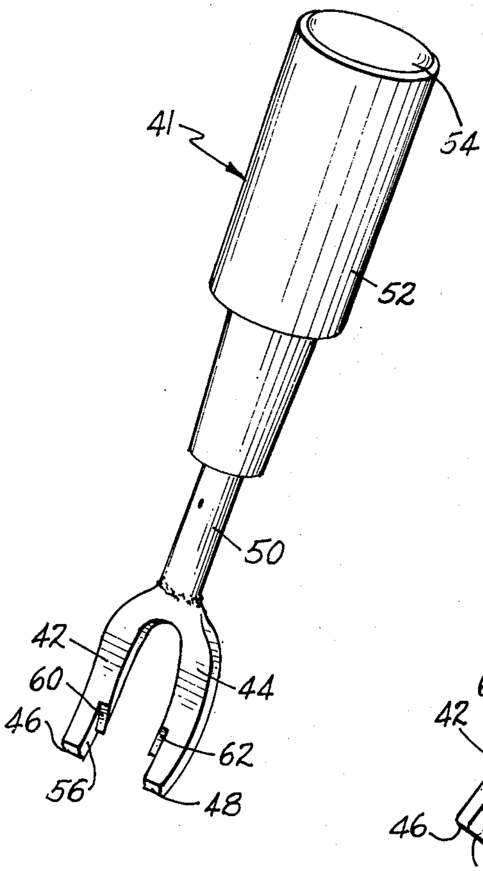
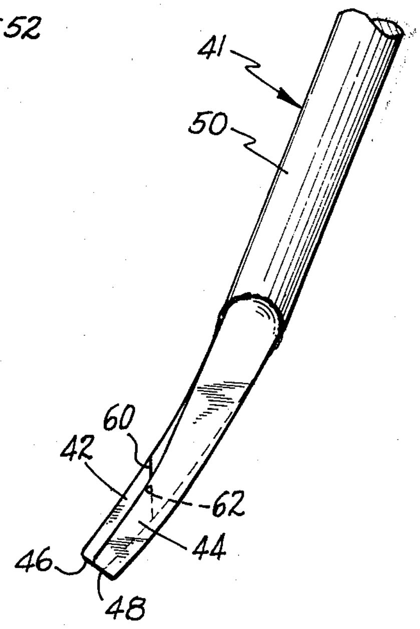
Fig. 5.

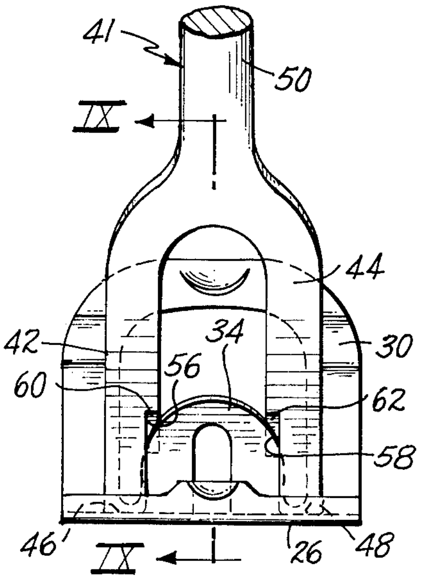
Fig. 6.
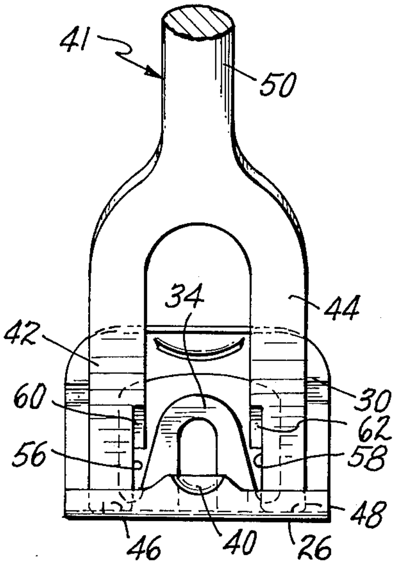
Fig. 7.
Fig. 8.
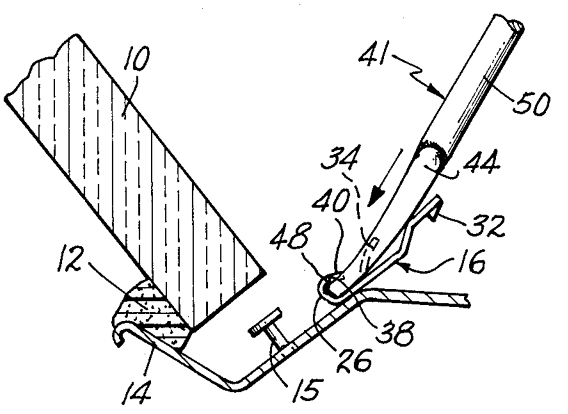
Fig. 9.
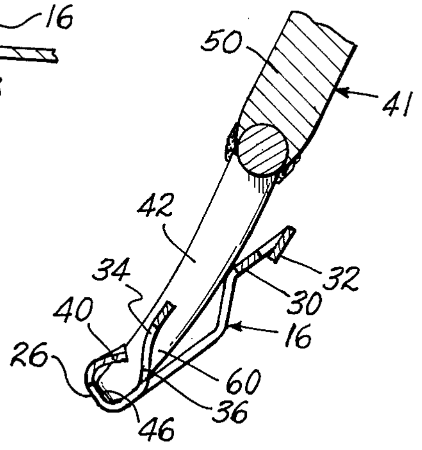

TOOL FOR APPLYING RETAINER CLIPS

BACKGROUND OF THE INVENTION

Present day automobile repair mechanics have found that installing windshield and rear window chrome trim pieces following auto body work has been hampered by the unavailability of a simple, practical tool for placing the trim retainer clips over the headed studs welded around the body window opening, these studs being permanently installed during the manufacture of the automobile.

The major problem is the risk of damage to the glass windows themselves by scratches and chips inadvertently being applied to the edges of the glass adjacent the studs while the clips are being installed by makeshift implements. Since tempered glass is used in modern autos, the infliction of scratches or cracks on the edge of the glass usually necessitates replacement of the entire window, since the chips or cracks will ultimately propagate through the entire glass panel.

Auto body repairmen usually attempt to insert the clips over the studs by using a screwdriver or the like, and this usually involves first tapping one side of the clip over the stud and then the other. This has proven to be time consuming, exasperating and expensive, when a windshield or rear window becomes chipped or cracked as a result of this rather haphazard procedure. Moreover, in many instances a sealant has been placed entirely around the window, and the sealant material prevents the repairman from clearly observing the precise location of the stud while he is attempting to drive the clip over same with a screwdriver. Needless to say, accidents and slippages often occur.

Since there are many studs in place about a typical window opening, requiring numerous clip installations in vertical, horizontal and inverted positions, it needs little imagination to conclude that a need for a simple, practical retainer clip installing tool exists in this field.

SUMMARY OF THE INVENTION

This invention is a tool for installing spring clips of particular form in place on headed studs about an automobile windshield or rear window opening. The tool permits the clip to be frictionally retained on the end of the tool while it is being installed, yet the tool itself does not have any moving parts that must be manipulated during the clip installing operation.

The tool is basically a bifurcated drift that engages a spring clip in an optimum manner for enabling the clip to be forcefully driven home over a fixed stud without deforming the clip, bending any of its parts or interfering with its placement over the stud element.

The tool is intended for use with a clip including at least a forward upturned flange and a central, upwardly inclined stud engaging grooved portion extending rearwardly from the upturned flange. The central portion of the clip has side edges that extend substantially normal to the upstanding forward flange. The forward flanges of these clips differ somewhat in size and contour, but the tool is adapted to accommodate a variety of sizes of clips having different sized central stud engaging portions and different forward upstanding flange arrangements.

The tool includes a pair of pusher prongs extending longitudinally of the tool axis, which is parallel to the direction of clip installation direction (hereinafter referred to, for convenience, as the "forward" direction). The forward, inner sides of the prongs are cut away so as to terminate in a bevel surface at the rearward area of each undercut, which, with the pusher prongs, cooperate with the clip in the desired manner for enabling its forceful installation. The forward ends of the prongs are slightly offset from each other in a vertical sense to provide another important cooperating relationship between the tool and the clip. The prongs may be curved to enhance the facility with which the tool can be used.

DETAILED DESCRIPTION OF THE INVENTION

With reference to the drawings appended hereto:

FIG. 1 is a side elevational view of a typical automobile windshield installation, showing the steel or chrome trim and retainer clip installed;

FIGS. 2 and 3 are top and side views, respectively, of a typical retainer clip;

FIG. 4 is an upper perspective view of the tool embodying the invention;

FIG. 5 is a side view of the tool embodying the invention;

FIG. 6 illustrates the tool engaging a clip;

FIG. 7 illustrates the tool engaging a different size clip;

FIG. 8 is a side view showing the tool in use; and

FIG. 9 is a view taken along section IX—IX of FIG. 6 showing how the sloping bevel surfaces of the prongs cooperate with the central portion of the clip.

In the drawings, which illustrate a preferred form of the invention, FIG. 1 shows a typical automobile windshield or rear window installation, where the glass 10 is bonded by suitable adhesive 12 to the edge area 14 of an opening in the body of an automobile. Headed studs 15 are permanently attached about the window opening adjacent the edge of the glass. Sealant 18 may also be installed, filling the area of the opening about the glass. A chrome or stainless steel trim piece 20 covers the area between the glass 10 and auto body 22 for appearance enhancement. The trim 20 is retained on the body 22 by retainer clip 16 which is installed on the stud 15 in a manner that will be more clearly discussed in the following description.

The typical clip 16 is shown in FIGS. 2 and 3. The clip is formed of spring metal, and includes a forward upturned flange 26, a central bottom area 28 and an offset rearward section 30. The rearward section 30 includes a depending locking lip 32 that is formed in such a manner that the bottom flange of the trim piece 20 can be forced past the lip towards the windshield, but cannot be withdrawn in the opposite direction without bending the clip upwardly with a tool or instrument designed for the purpose.

The central portion 34 of the clip 16 is cantilevered from its base 35 and is grooved as at 36 along its length to accommodate the stud. The central portion 34 is inclined rearwardly, and bent upwardly, as shown, portion 34 normally extending at an acute angle upwardly and rearwardly from its base 35. Clip 16 is forced forwardly, or to the left as viewed in FIG. 3, so that the shank of stud 15 enters the groove 36 of the clip. The head of the stud stays above the upper surface of the central portion 34 and passes beneath another locking lip 38 on a rearwardly extending portion 40 of the forward flange 26. The lip 38 normally holds the clip against inadvertent removal from the stud, thereby ensuring that the assembly of stud, clip and trim piece stay together after installation.

In FIGS. 4 and 5, a tool 41 for installing such clip as illustrated in FIGS. 2 and 3 is illustrated. Tool 41 embodies the present invention and is characterized by a pair of pusher prongs 42–44 that may have any suitable cross-section, but which are preferably rectangular in this instance. Prongs 42–44 each are dimensioned so that they are adequately long to retain thereon a clip to be installed, and are of substantially equal length so that they co-terminate in substantially the same plane at their extremities 46–48. The extremities 46–48 are intended to abut against the forward upturned flange 26 of the clip and under the rearwardly extending portion of the flange of the clip. The prongs preferably are curved upwardly generally as illustrated.

The prongs 42–44 are slightly vertically offset from each other as seen in FIG. 5 to enable the clip to be frictionally engaged and retained on the tool. The prongs may terminate in a single tool shank 50 having a handle 52 preferably having an elastomer gripping and shock absorbing material 54 thereon, although this does not form a characterizing portion of the present invention.

The inner, forward surfaces of each prong are cut back to provide undercut wall sections 56–58, the spacing of these walls being at least equal to the greatest width of a central portion 34 of a clip to be installed by the tool, although the spacing of the sidewalls may be somewhat greater than the width of such central portion if the clip has a sufficient rearward extension 40 of the flange 26 to enable the prongs 42–44 to frictionally engage the underside of the rearward extension 40.

The sidewalls 56–58 of undercut portions of prongs 42–44 terminate at their rearward ends at bevel faces 60–62 which slope forwardly and downwardly from the upper surfaces of prongs 42–44. The bevel surfaces 60–62 preferably are also vertically offset with the extremities 46–48 of the prongs and, it will be noted from FIG. 5, that the rearward areas of the prongs 42–44 are not vertically offset.

In FIGS. 6 and 7, the tool is shown with two different size clips attached thereto, ready for insertion onto a stud. Also, in FIG. 8, the tool is shown in actual use (the sealant 18 is not shown in FIG. 8).

As seen in FIG. 6, the width of central portion 34 of larger clip 16 shown in this figure corresponds to the distance between the sidewalls 56–58 of the undercut areas of the prongs 42–44, and the sloping bevel surfaces 60–62 fit beneath the underside of the edges of the central portion 34 of the clip. The front extremities 46–48 of the prongs 42–44 abut the rearward face of flange 26 and the rearward area 30 of clip 16 abuts the undersides of the prongs in the areas of the prongs where they are not vertically offset. The vertical offset of the ends 46–48 of the prongs and including the bevel surfaces 60–62 causes the forward extremities and the bevel surfaces to tend to twist the clip as it is placed on the tool to make it ready for installation on the stud. Since the prongs themselves also are deformed slightly by vertical bending thereof as the clip is placed on the tool, the net result is that the clip is frictionally retained on the tool by the combined friction and spring restoring forces that are in balance when the clip is properly engaged by the prongs and the bevel surfaces of the tool.

As shown in FIG. 7, the width between undercut sidewalls 56–58 may be greater than the width of the central portion 34 of clip 16, and the clip will still be retained on the tool because of the effect of the vertically offset prong extremities that are wedged beneath the horizontally rearwardly extending portion 40 of flange 26. Since the rearward portion 30 of clip 16 bears against the underside of the prongs at an area where the prongs are not offset from each other, the clip will be retained frictionally by the forward, offset portion of the prongs.

In FIG. 8, the tool is illustrated as it pushes a clip 16 onto stud 15. The upward flange 26 absorbs the driving impact or installing force of the tool, as is desirable with clips of this type, which tend to be quite brittle and to break when bent to excess. FIG. 9, which is a sectional view taken along IX—IX of FIG. 6, shows the position of the central portion 34 of the clip 16 with respect to the bevel surface 60 of prong 42 of the tool during installation, with the clip in place on the tool. Of course, if a clip according to the embodiment shown in FIG. 7 is to be installed, the extremity 46 of prong 42 lies beneath the rearwardly extending portion 40 of flange 26 of clip 16 and the bevel surface 60 will not engage the central portion 34. However, since the rearward portion 30 of clip 16 bears upwardly against the underside of prongs 42–44 while the rearwardly extending portion 40 of flange 26 eliminates the vertical offset between the prongs 42–44, the result will be that the clips 16 will be frictionally retained on the ends of the prongs 42–44.

It should be understood that the prongs 42–44 are illustrated as being parallel and extending straight forwardly and rearwardly for exemplary purposes. The concept underlying this invention extends equally to a prong arrangement that could be slightly divergent or curved, if the placement and retention of the clips to be installed would be facilitated, or to accommodate different shaped clips having upstanding forward flanges and upwardly inclined central stud-receiving portions. The scope of the invention is intended to be limited solely by the claims that follow, rather than the particular embodiment illustrated and described above.

We claim:

1. A tool for installing a retainer clip including a forward up-turned flange and an upwardly and rearwardly inclined central portion adapted to engage a fixed stud member, the tool comprising a pair of laterally spaced, elongated pusher prongs having vertically offset end portions, generally co-planar rearward portions and undercut inner surface areas along said end portions terminating at downwardly and forwardly sloped rear bevel surfaces, said end portions of said prongs including sections spaced laterally apart less than the total width of the forward up-turned flange of the clip to be installed by the tool, whereby the prongs may both engage said flange at the ends of the prongs during installation of the clip on either side of the central portion of the clip.

2. The tool recited in claim 1, further wherein the space between sidewalls of said undercut portions of said prongs is at least as great as the greatest width of the central upwardly and rearwardly inclined portion of the clip to be installed by the tool, and said bevel surfaces are inclined substantially at the same inclination as said central portion of the clip.

3. The tool recited in claim 1, further wherein said prongs are each upwardly curved, at least over their end portions.

4. The tool recited in claim 1, further wherein the longitudinal distance between the forward extremities of the prongs and the bevel surfaces are dimensioned to accommodate the clip on the tool with the forward extremities of the prongs in engagement with the upturned flange and the bevel surfaces in engagement with the underside of the upwardly inclined central portion of the clip.

* * * * *